(12) United States Patent
Bockelmann et al.

(10) Patent No.: US 11,691,360 B2
(45) Date of Patent: Jul. 4, 2023

(54) METHOD FOR MANUFACTURING A WIND TURBINE BLADE

(71) Applicant: Siemens Gamesa Renewable Energy A/S, Brande (DK)

(72) Inventors: Paul Bockelmann, Hamburg (DE); Sebastian Elbano Diaz Farago, Aalborg (DK); Michael Nauheimer, Aalborg (DK); Fabian Walz, Buchholz (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 27 days.

(21) Appl. No.: 17/212,472

(22) Filed: Mar. 25, 2021

(65) Prior Publication Data
US 2021/0299980 A1    Sep. 30, 2021

(30) Foreign Application Priority Data
Mar. 27, 2020    (EP) .................................... 20166196

(51) Int. Cl.
*B29C 70/54*    (2006.01)
*B29C 65/00*    (2006.01)
*B29C 70/30*    (2006.01)
*B29L 31/08*    (2006.01)

(52) U.S. Cl.
CPC .......... *B29C 70/54* (2013.01); *B29C 66/9674* (2013.01); *B29C 70/30* (2013.01); *B29C 66/90* (2013.01); *B29C 2945/7604* (2013.01); *B29C 2945/7605* (2013.01); *B29C 2945/76006* (2013.01); *B29C 2945/7615* (2013.01); *B29C 2945/7629* (2013.01); *B29C 2945/76254* (2013.01); *B29C 2945/76381* (2013.01); *B29C 2945/76929* (2013.01); *B29L 2031/085* (2013.01)

(58) Field of Classification Search
CPC ...... B29C 66/9674; B29C 70/30; B29C 66/90
See application file for complete search history.

(56) References Cited

U.S. PATENT DOCUMENTS

2017/0001387 A1    1/2017    Ostergaard et al.
2017/0015070 A1    1/2017    Bauer et al.

FOREIGN PATENT DOCUMENTS

CN    106457696 A    2/2017

OTHER PUBLICATIONS

Extended European Search Report in corresponding European Patent Application No. 20166196.4 dated Sep. 1, 2020. 6 pages.
(Continued)

*Primary Examiner* — Jacob T Minskey
*Assistant Examiner* — Adrien J Bernard
(74) *Attorney, Agent, or Firm* — Schmeiser, Olsen & Watts LLP (57) ABSTRACT

A method for manufacturing a wind turbine blade, including the step of monitoring a process of infusing and/or curing a fiber lay-up with resin in a mold, wherein the monitoring is based on sensor data obtained from the resin infusion and/or curing process displayed in an augmented reality device, is provided. Displaying sensor data obtained from the resin infusion and/or curing process in an augmented reality device allows to better monitor the resin infusion and/or curing process. Thus, the quality of the manufactured wind turbine blade can be improved.

11 Claims, 6 Drawing Sheets

(56) References Cited

OTHER PUBLICATIONS

Gardiner, Ginger, "Sensors for monitoring resin infusion flow front and cure," Compositesworld, XP055726360, URL: https://www.compositesworld.com/articles/sensors-for-monitoring-resin-infusion-flow-front-and-cure; 2018; 4 pages.

Koetje, Arnold, "First-time-right. Realtime visualisation infusion using augmented reality," XP055726368, URL: http://inhollandcomposites.nl/wp-content/uploads/2018/05/FTR-realtime-visualisation-infusion-using-augmented-reality-iss2-sept2018.pdf; 2018; 2 pages.

Inholland Composites, "Augmented Reality Gimmick or Game Changer,"pp. 1, XP054980838, URL :https://www.youtube.com/watch?v=r39DpojM5n8; 2019; 1 page.

METHOD FOR MANUFACTURING A WIND TURBINE BLADE

CROSS-REFERENCE TO RELATED APPLICATIONS

This application claims priority to European Application No. 20166196.4, having a filing date of Mar. 27, 2020, the entire contents of which are hereby incorporated by reference.

FIELD OF TECHNOLOGY

The following relates to a method for manufacturing a wind turbine blade.

BACKGROUND

Wind turbine rotor blades usually comprise a fiber-reinforced laminate structure. The fiber-reinforced laminate structure is manufactured by wetting a fiber lay-up with resin and curing the resin. The wetting process includes, for example, infusing the fibers with resin. The quality of the manufactured fiber-reinforced laminate highly depends on several parameters related to the infusion and curing process such as temperature and pressure of the resin. For example, the temperature dependent viscosity of the resin influences the resin flow through the fibers. Therefore, monitoring the parameters influencing the infusion and curing process is desirable. Further, wind turbine blades can be manufactured in a closed mold preventing a visual inspection of the resin flow and the curing process during the manufacturing process.

SUMMARY

An aspect of the present invention relates to providing an improved method for manufacturing a wind turbine blade.

Accordingly, a method for manufacturing a wind turbine blade is proposed. The method comprises the step of monitoring a process of infusing and/or curing a fiber lay-up with resin in a mold. The monitoring is based on sensor data obtained from the resin infusion and/or curing process displayed in an augmented reality device.

Displaying sensor data obtained from the resin infusion and/or curing process in an augmented reality device allows to better monitor the resin infusion and/or curing process. It allows a real-time visualization of the process. In particular, insight into the current state of the infused resin and/or of the curing of the resin during the manufacturing process can be obtained. Therefore, parameters influencing the infusion and/or curing process can be controlled. Thus, the quality of the manufactured wind turbine blade can be improved. For example, a uniform distribution of the resin throughout the fibers can be better achieved. For example, it can be better prevented that portions of the fibers remain dry, i.e. without resin. Another example is that the occurrence of enclosed air bubbles in the laminate can be reduced. Therefore, a strength and durability of the laminate structure can be improved.

The wind turbine blade is part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected via a transition piece to a foundation of the wind turbine, such as a monopile in the seabed.

The wind turbine blade, e.g., its root section, is fixedly or rotatably connected to the hub. Apart from the (cylindrical) root section, the wind turbine blade is formed aerodynamically. The wind turbine blade comprises, for example, a pressure side (upwind side) and a suction side (downwind side). The pressure side and the suction side are connected with each other at a leading edge and a trailing edge. The pressure and suctions sides and the leading and trailing edges define an airfoil of the wind turbine blade.

The wind turbine blade is, for example, manufactured by arranging the fiber lay-up in the mold, infusing the fiber lay-up with resin, and curing the resin.

The fibers are, for example, arranged in the mold in a dry condition, i.e. as fibers without a resin. The fibers may also be (partially) pre-impregnated fibers (prepreg). The fibers include, for example, glass fibers, carbon fibers, aramid fibers and/or natural fibers.

The fiber lay-up may include a fiber core material, such as wood, balsa, PET foam and/or PVC foam. The core material may be sandwiched between layers of fibers such that a fiber-reinforced resin laminate with a core structure is obtained.

Further, reinforcement beams may be arranged in the mold and connected to the fiber lay-up by the resin infusion and curing.

The resin is infused into the fiber lay-up, for example, by a vacuum-assisted resin infusion process. For example, the fiber lay-up is covered with a vacuum bag and a vacuum is generated in a space covered by the vacuum bag, e.g. in a space between the mold and the vacuum bag. The resin is then infused into this space due to the generated vacuum, thus wetting the fibers.

The mold may comprise a lower mold component and an upper mold component. A fiber lay-up for forming a lower shell of the blade (e.g., a pressure side of the blade) may be arranged in the lower mold, and a fiber lay-up for forming an upper shell of the blade (e.g., a suction side of the blade) may be arranged in the upper mold. The upper mold may be arranged on the lower mold, thus forming a cavity between them. The mold may also comprise a mold core in the mold cavity. The fiber lay-ups in the lower and upper molds may be covered by a vacuum bag. Resin may be infused in a space between the vacuum bag and the lower and upper molds in the closed state of the mold, i.e. with the upper mold arranged on the lower mold.

The resin includes, for example, thermosets, thermoplastics, epoxy, polyurethane, vinyl ester and/or polyester.

The resin is, for example, cured by applying heat. The result is a fiber-reinforced resin laminate.

Monitoring the process of infusing and/or curing the fiber lay-up with resin based on the sensor data displayed in the augmented reality device includes, for example, inspecting the displayed sensor data. It may include detecting a deviation of the displayed sensor data from a desired state. It may include an alert system to indicate such a deviation.

The sensor data include measurement data obtained by one or more sensors. The one or more sensors are arranged at or close to the mold, the fibers, the resin and/or their nearby environment. The one or more sensors are connected, wired or wireless, with the augmented reality device. For example, the one or more sensors are connected, wired or wireless, via a computing unit with the augmented reality device. The computing unit may be an external hardware computing unit being separate from the augmented reality device. Alternatively, the augmented reality device itself may include the computing unit. The computing unit may also include a cloud-based computing unit.

The augmented reality device comprises a monitor to display the sensor data. The augmented reality device includes, for example, augmented reality glasses, a tablet, a laptop, a mobile phone and/or a projector.

An augmented reality device is, in particular, a device, which allows to display real-world information to a user, the real-world information being augmented in a computer-assisted manner. Displaying the sensor data in the augmented reality device includes, in particular, displaying the sensor measurement data as augmented information overlaid onto a representation of the mold or the blade. It is also possible to display the sensor data in a virtual reality device or by a projection with a projector onto the mold or the blade during manufacturing.

According to an embodiment, the sensor data include a measured physical quantity of the mold, of the fiber lay-up arranged in the mold and/or of the resin.

This allows to monitor a physical quantity of the mold, the fiber lay-up and/or the resin which is influencing the infusion and/or curing process.

The sensor data may also include a measured physical quantity of a nearby environment of the mold, the fiber lay-up and/or the resin.

According to a further embodiment, the physical quantity includes temperature, pressure, current position of the resin, viscosity, refractive index, density, electric properties and/or dielectric properties.

Monitoring the temperature of the mold, the fiber lay-up and/or the resin allows to control, for example, the temperature of the resin such that the temperature-dependent viscosity of the resin is suitable for the desired resin flow.

Monitoring the pressure, and thus the generated vacuum, e.g., in the space covered by the vacuum bag, allows to control the resin flow and/or to detect a resin leakage.

Monitoring the current position of the resin allows to control a flow front of the resin during infusion.

Monitoring the density of the resin and/or the refractive index of the resin (which is related to the density of the resin), allows to control the curing state of the resin.

Monitoring electric and/or dielectric properties of the resin, which depend on structural properties of the resin, allows to control the curing state of the resin.

According to a further embodiment, the sensor data include a chemical information of the resin.

This allows, for example, to control a curing state of the resin.

According to a further embodiment, the sensor data include location data and/or time data.

The sensor data may include in addition to sensor measurement data obtained by the one or more sensors (such as measured physical of chemical quantities of the mold, the fiber lay-up and/or the resin) also location data indicating the location of where the measured quantity was measured, i.e. where the measured is present. For example, a temperature sensor may be placed in a specific location within the fiber lay-up, then the sensor data include the measured temperature at this location and the spatial coordinates of this location.

Furthermore, the sensor data may include also time data indicating the time when the measurement data were obtained.

Having the location data allows to display the measurement data as function of the location data. Thus, it allows to display, for example, a spatial distribution of the measurement data. For example, a temperature distribution of the mold may be displayed.

Having the time data allows to display the measurement data as function of the time data. Thus, it allows to display a timely evolution of the measurement data. For example, a development of a flow front of the resin can be displayed.

According to a further embodiment, the sensor data displayed in the augmented reality device are processed sensor data including a temperature distribution, a pressure distribution, a resin flow front representation and/or a resin curing representation.

The sensor data obtained from the resin infusion and/or curing process may be stored and processed by a computing unit. The data may, for example, be interpreted and interpolated using data analytics models to prepare for visualization. The data may, for example, be processed in order to derive from a measured quantity a physical or chemical quantity of interest. The data may, for example, be processed to derive a spatial and/or timely distribution of a quantity, such as a spatial temperature distribution, a spatial pressure distribution, a spatial resin flow front state, a spatial resin curing state, a temperature evolution, a pressure evolution, a resin flow front evolution and/or a resin curing evolution.

By displaying the processed sensor data in the augmented reality device and, thereby, monitoring the processed sensor data, the resin infusion and/or curing process can be better controlled.

According to embodiments, the sensor data are displayed in the augmented reality device overlaid onto a real-world representation of the mold and/or of the blade.

The user of the augmented reality device, e.g., augmented reality glasses, sees, for example, the real mold and/or blade during manufacturing as well as the sensor data as augmented information overlaid onto it.

According to a further embodiment, the sensor data are displayed in the augmented reality device overlaid onto digital data of the mold and/or of the blade.

The digital data may be visual data of the mold and/or of the blade during manufacturing. The visual data are, in particular, obtained by a camera. The camera may be included in the augmented reality device or may be separate from the augmented reality device. The camera, for example the augmented reality device including the camera, may include a tracking system to track the relative position of the camera to the mold and/or the blade. For example, a marker-based or model-based tracking may be used. The tracking may be done by capturing visual data (video stream or frames of the video stream) through the camera and analyzing the visual data by means of a computer algorithm and, for example, said computing unit. Based on the computer algorithm, the mold shape and/or blade shape during manufacturing may be recognized in the visual data for tracking and subsequent overlay of augmented information in the form of the sensor data. In this case, the augmented reality device displays the sensor data overlaid on the camera-based visual data of the mold or the blade during manufacturing.

The digital data may also be a three-dimensional model of the mold and/or of the blade. In this case, the augmented reality device displays the sensor data overlaid on the three-dimensional model of the mold and/or of the blade.

Displaying the sensor data in the augmented reality device overlaid onto the digital data of the mold and/or of the blade allows an intuitive and illustrative recognition of the complex process of the resin infusion and/or curing. Further, it can be seen as a direct instruction of how to control the resin infusion and/or curing process.

According to a further embodiment, the sensor data are collected by a sensor arranged in the internal structure of the mold and/or at an inner surface of the mold.

This allows to better control quantities of the mold, such as a temperature of the mold which significantly influences the resin flow.

For example, one or more sensors are arranged within boreholes of the mold. For example, the boreholes may have an opening towards the inner surface of the mold, and the one or more sensors are arranged within the boreholes such that they are flush with the inner surface of the mold.

According to a further embodiment, the sensor data are collected by a sensor arranged on and/or within the fiber lay-up.

This allows to better measure a quantity of the fiber lay-up and/or of the incoming resin.

According to a further embodiment, at least a portion of the sensor remains in the infused and cured fiber lay-up of the manufactured blade.

This allows to measure sensor data within the fiber lay-up, e.g., in the internal structure of the fiber lay-up, without the need to remove the sensor later.

For example, an optical fiber may be used as sensor, and (a portion of) the optical fiber remains in the manufactured blade.

According to a further embodiment, the method comprises, after the step of monitoring, the step of altering the resin infusion process based on the monitoring result.

This allows to modify the infusion and/or curing process based on the sensor data displayed in the augmented reality device. The infusion and/or curing process may be promptly manipulated based on the sensor data displayed in the augmented reality device. For example, it allows to intervene when process parameters are unsuitable or unfortunate for the production of the wind turbine blade.

According to a further embodiment, the resin infusion process is altered by opening a resin inlet channel, heating the mold and/or increasing the infusion pressure.

For example, as soon as the mold temperature is suitable, one or more first resin inlet channels might be opened to start the resin infusion.

A further example is that the mold may comprise several resin inlet channels configured for being opened subsequently. The several resin inlet channels might be distributed along a longitudinal direction and/or along a circumferential direction of the mold. After one or more first resin inlet channels of the several resin inlet channels have been opened to start the resin infusion, further resin inlet channels might be opened depending on the monitored resin flow.

A further example is that if it is detected that there are dry spots of the fibers, the mold may be heated locally in an environment of the detected dry spot to decrease the viscosity of the resin and cause it to flow to the still dry spot.

Further possible implementations or alternative solutions of the embodiment of the present invention also encompass combinations—that are not explicitly mentioned herein—of features described above or below with regard to the embodiments. The person skilled in the art may also add individual or isolated aspects and features to the most basic form of the present invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Although the embodiment of the present invention has been described in accordance with exemplary embodiments, it is obvious for the person skilled in the art that modifications are possible in all embodiments.

Figure 1:
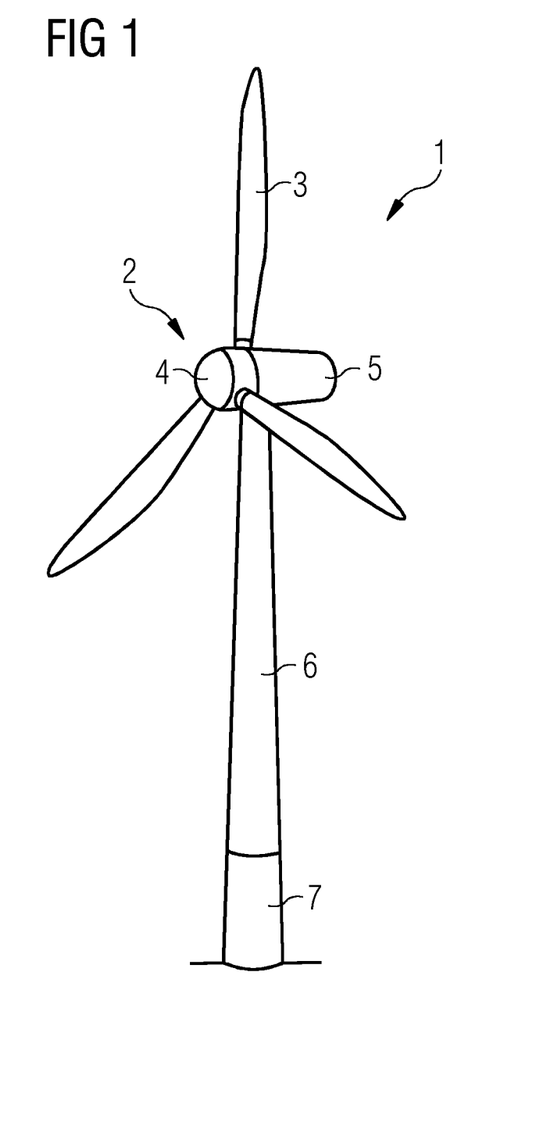
FIG. 1 depicts a wind turbine according to an embodiment.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a monopile or tripile. The foundation 7 is connected to and/or driven into the ground or seabed.

In the following an improved method for manufacturing a wind turbine blade 3 is described with respect to FIGS. 2 to 6.

Figure 2:
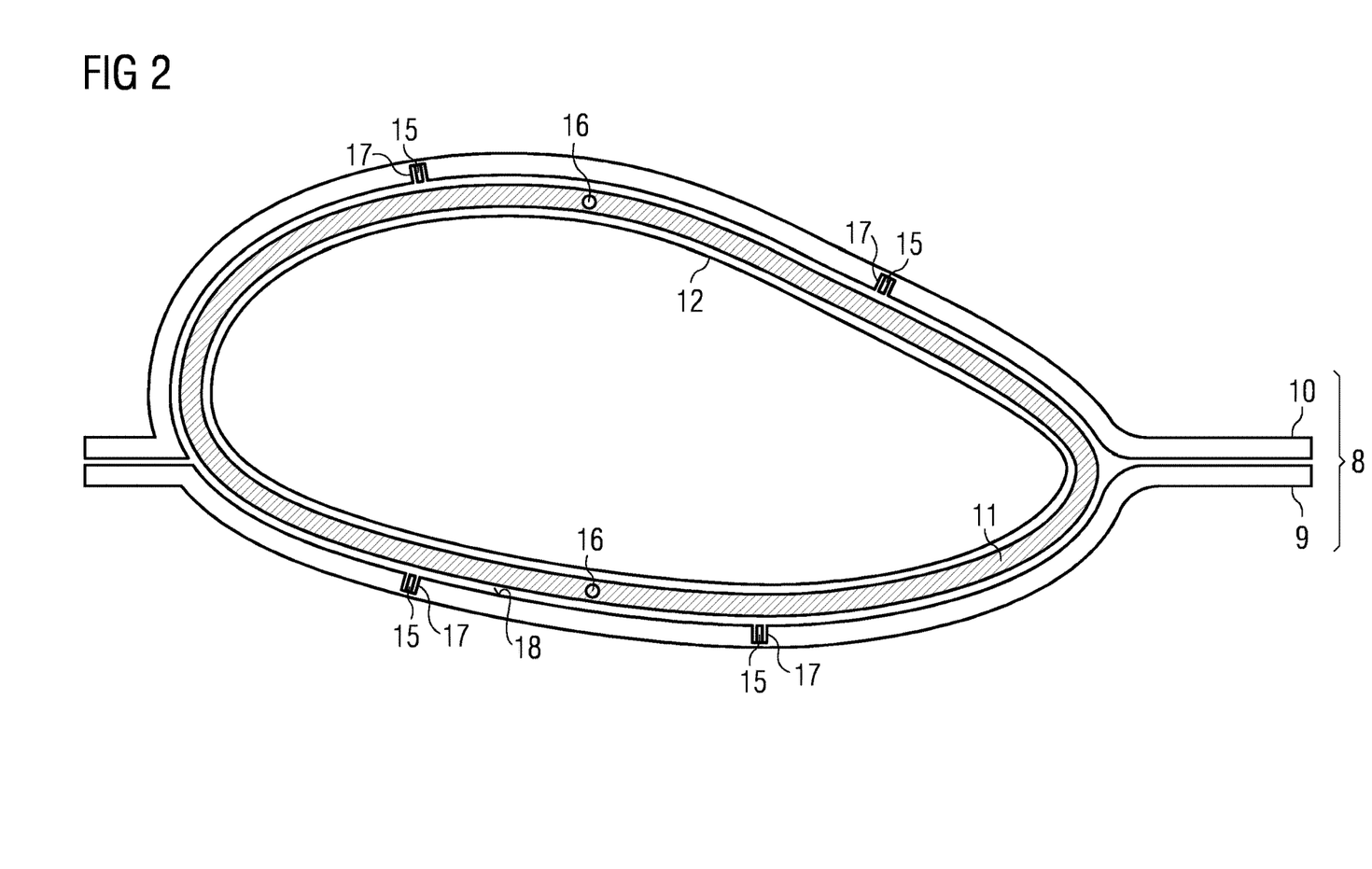
FIG. 2 depicts a cross-section view of a mold for manufacturing a wind turbine blade of the wind turbine of FIG. 1.

FIG. 2 shows a mold 8 in cross-section for manufacturing one of the wind turbine blades three of FIG. 1. The mold 8 comprises a lower mold component 9 and an upper mold component 10. The mold 8 is shown in FIG. 2 in a closed state in which the upper mold component 10 is arranged on the lower mold component 9. Furthermore, a dry fiber lay-up 11 is arranged in the mold 10. The fiber lay-up 11 may also comprise a core material and/or reinforcement beams (not shown). Additionally, also a shear web may be arranged in the mold 8 (not shown).

Figure 3:
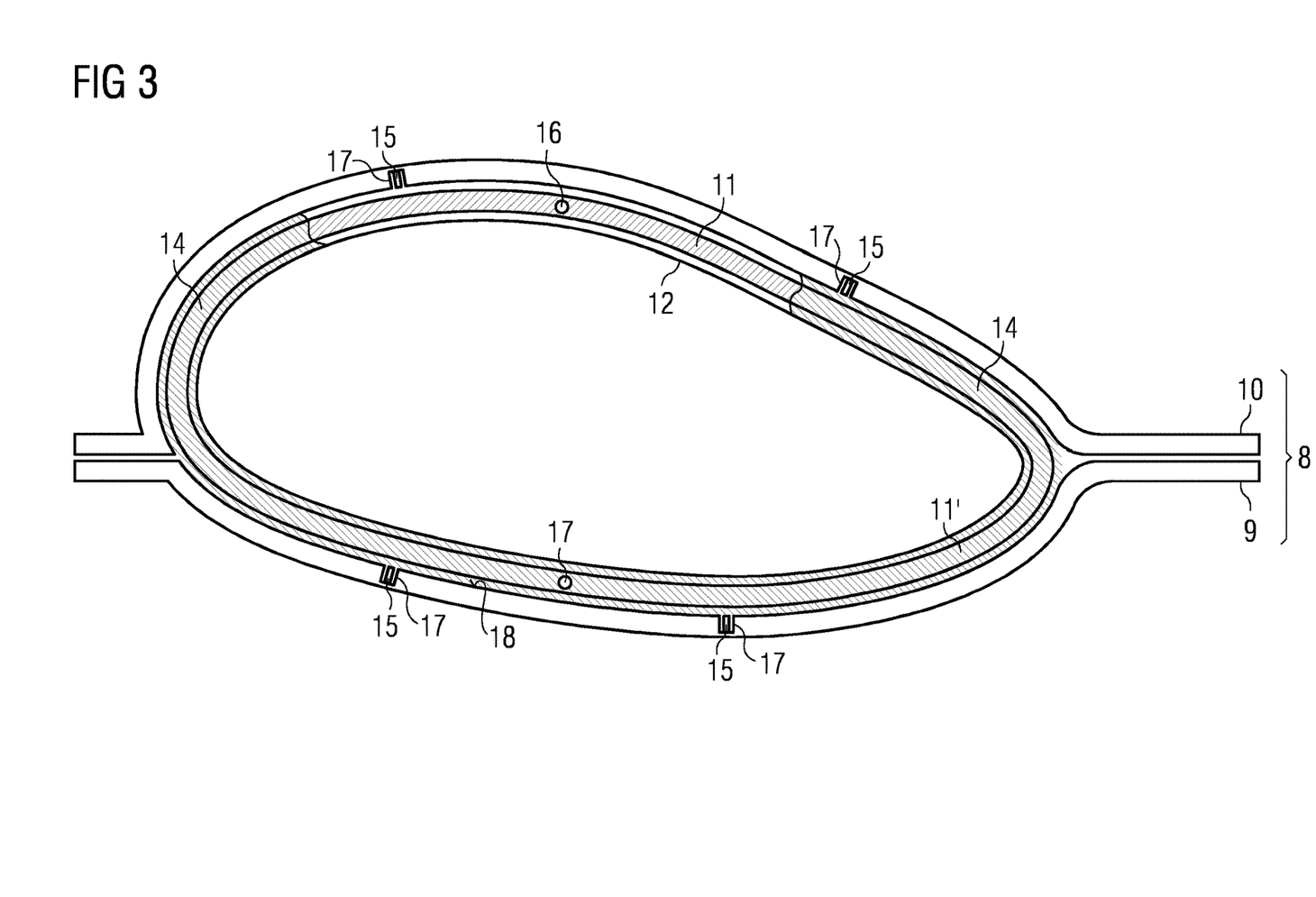
FIG. 3 depicts a view similar as FIG. 2 but with resin partly infused into a fiber lay-up of the blade.

In step S1 of the method, the fiber lay-up 11 is casted by a known vacuum infusion process. In this vacuum infusion process, the fiber lay-up 11 is covered with a vacuum bag 12 (FIG. 2). Then, a vacuum is generated in a space covered by the vacuum bag 12. Next, one or more resin inlet channels 13 (not visible in the cross-section view of FIG. 2, only shown in FIG. 4) are opened, and resin 14 is infused into the fiber lay-up 11 due to the generated vacuum (FIG. 3). Then, the resin 14 is cured resulting in a fiber reinforced resin laminate structure.

In order to monitor the resin infusion process and the resin curing process, there are several sensors 15, 16 arranged within the mold 8 and within the fiber lay-up 11. As an example, FIG. 2 shows sensors 15 arranged in the internal structure of the mold 8. The mold 8 comprises several boreholes 17 having an opening towards an inner surface 18 of the mold 8. Each of the sensors 15 is arranged in one of the boreholes 17 such that the respective sensor 15 is flush with the inner surface 18 of the mold 8.

As a further example of the sensors, FIG. 2 shows sensors 16 arranged within the fiber lay-up 11, i.e. embedded in the fiber lay-up 11. The mold 8 may comprise one or more or all of the shown sensors 15, 16. The mold 8 may also comprise additional sensors not show in the figures.

Figure 4:
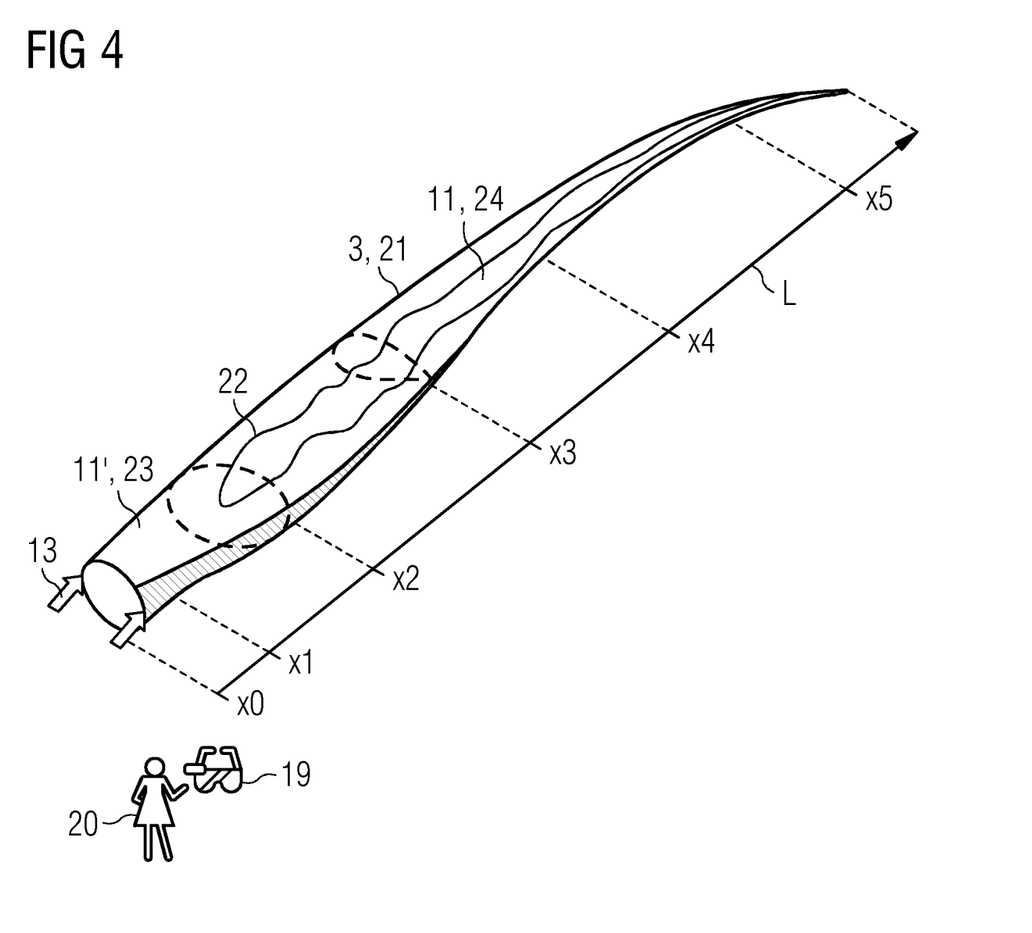
FIG. 4 depicts a three-dimensional image of the blade of the wind turbine of FIG. 1 over-laid with augmented information from the manufacturing process as seen through an augmented reality device according to an embodiment.

FIG. 4 shows a first example of monitoring the resin infusion process based on sensor data obtained with one or more of the sensors 15 and/or of the sensors 16 shown in FIGS. 2 and 3. In the example of FIG. 4, the sensor 15, 16 are distributed—in addition to a circumferential direction, as shown in FIGS. 2 and 3—also along a longitudinal direction L of the blade 3 at longitudinal positions X0, X1, X2, X3, X4 and X5.

In step S2 of the method, sensor data are obtained by the sensors 15, 16. Step S2 can be performed before step S1, simultaneously with S1 or after step S1. For example, before opening the one or more resin inlet channels 13 (FIG. 4) for starting the infusion (step S1), sensor data such as the temperature of the mold 8 could be obtained (step S2). This allows to start the resin infusion (step S1) only when the mold 8 has an appropriate temperature. In another example, sensor data of the mold 8, the fiber lay-up 11 or the resin 14 could be obtained (step S2) during the infusion and/or curing of the resin 14 (step S1).

In step S3, the obtained sensor data are processed by a computing unit (not shown) included, for example, in an augmented reality device 19. The sensors are, for example, connected wireless with the computing unit in the augmented reality device 19.

The sensor data are, for example, interpreted and interpolated using data analytics models to prepare for visualization. The data are, in the example of FIG. 4, processed to derive a spatial distribution of a flow front of the resin 14.

In step S4, the processed sensor data are displayed in the augmented reality device 19. The augmented reality device of FIG. 4 is in the form of augmented reality glasses 19 (AR-glasses) worn by a worker 20. The obtained and processed sensor data are displayed in the AR-glasses 19 overlaid onto a digital three-dimensional representation 21 of the blade 3.

FIG. 4 shows a worker 20 who is monitoring the manufacturing process of the blade 3. In reality, the worker 20 is standing in front of the closed mold 8 (see FIGS. 2 and 3) and cannot look inside the mold 8. However, information about the infusion process is nevertheless made available for the worker 20 by means of the AR-glasses 19. FIG. 4 shows an example of what the worker 20 sees in the display of the AR-glasses 19. The worker 20 sees the three-dimensional model 21 of the blade 3 the AR-glasses 19. Furthermore, overlaid onto the three-dimensional model 21 are processed sensor data representing the flow front 22 (FIG. 4) of the infused resin 14 flowing through the fiber lay-up 11 (FIG. 3). Areas of the fiber lay-up 11' which are already wetted with resin 14, i.e. impregnated parts of the blade 3, are denoted with 23 in FIG. 4. Areas of the fiber lay-up 11 which are still dry are denoted with 24 in FIG. 4.

The worker 20 with the AR-glasses 20 can walk around the closed mold 8 and inspect the wetting process of the fiber lay-up 11, 11'. The AR-glasses 19 are equipped with a tracking system (not shown) which is capturing visual data of the closed mold 8 (FIG. 3) and is able to recognize the mold shape for tracking and subsequent overlay of augmented information in form of the resin flow front 22 (FIG. 4).

The worker 20 monitors in step S5 the resin infusion process and/or the resin curing process based on the processed sensor data displayed in the AR-glasses 19.

In case that the worker 20 recognizes, for example, that the resin flow front 22 is not developing as required, she can take measures to alter the infusion process in step S6. For example, if the worker 20 recognizes that there remain dry spots of the fiber lay-up 11 in certain areas, the mold 8 could be locally heated up. Heating up the mold 8 affects the viscosity of the resin 14. With higher temperature, the viscosity of the resin 14 decreases and, thus, the resin flow is improved.

In embodiments, the mold 8 (FIG. 2,3) comprises resin inlet channels 13 in addition to the longitudinal position X0 also at one or more of the further longitudinal positions X1 to X5 (FIG. 4). In this case, the worker 20 could monitor the resin infusion process and as soon as the resin flow front 22 reaches or passes a certain position x1 to X5, a resin inlet channel at this position could be opened.

Figure 5:
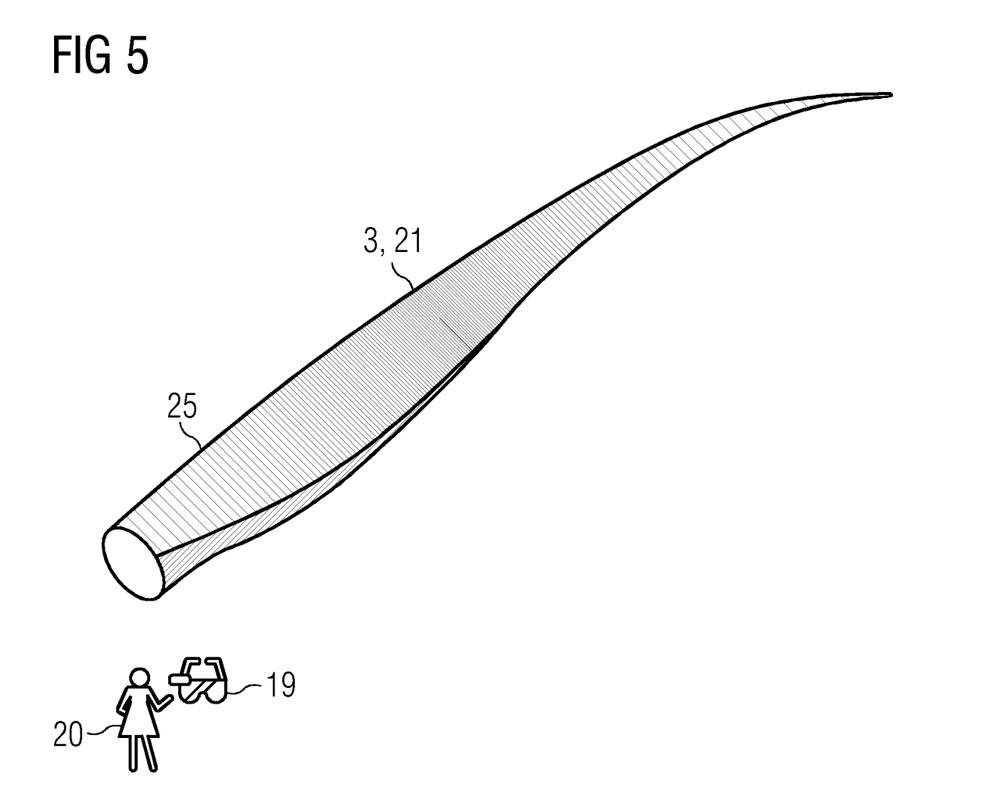
FIG. 5 depicts a three-dimensional image of the blade of the wind turbine of FIG. 1 over-laid with augmented information from the manufacturing process as seen through an augmented reality device according to another embodiment.
Figure 6:
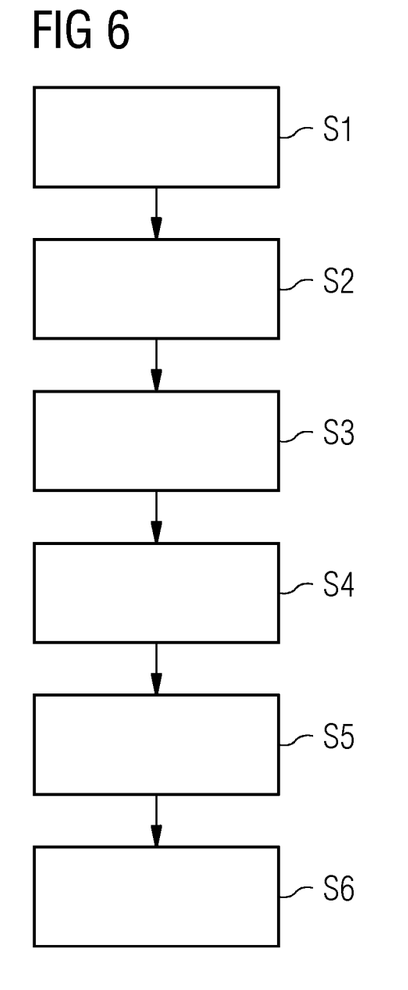
FIG. 6 depicts a flowchart illustrating a method for manufacturing the wind turbine blade of the wind turbine of FIG. 1.

FIG. 5 shows another example of monitoring a resin infusion and/or curing process. As in the example of FIG. 4, the worker 20 sees in the AR-glasses 19 the three-dimensional model 21 of the blade 3. Furthermore, overlaid onto this three-dimensional model are processed sensor data representing a temperature distribution 25 (FIG. 4) of, for example, the inner surface 18 of the mold 8 (FIG. 2).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for manufacturing a wind turbine blade, comprising:
   monitoring a process of infusing and/or curing a fiber lay-up with resin in a mold, wherein the monitoring is based on sensor data obtained from a resin infusion and/or curing process displayed in an augmented reality device, wherein the sensor data includes a measured physical quantity, the measured physical quantity including:
   a temperature of the mold, of the fiber lay-up arranged in the mold, and/or of the resin, or
   a viscosity of the resin;
   altering the process by heating the mold based on the sensor data.

2. The method according to claim 1, wherein the physical quantity further includes, pressure, current position of the resin, refractive index, density, electric properties, and/or dielectric properties.

3. The method according to claim 1, wherein the sensor data includes a chemical information of the resin.

4. The method according to claim 1, wherein the sensor data includes location data and/or time data.

5. The method according to claim 1, wherein the sensor data displayed in the augmented reality device are processed sensor data including a temperature distribution, a pressure distribution, a resin flow front representation and/or a resin curing representation.

6. The method according to claim 1, wherein the sensor data are displayed in the augmented reality device overlaid onto digital data of the mold and/or of the blade.

7. The method according to claim 1, wherein the sensor data are collected by a sensor arranged in an internal structure of the mold and/or at an inner surface of the mold.

8. The method according to claim 1, wherein the sensor data are collected by a sensor arranged on and/or within the fiber lay-up.

9. The method according to claim 8, wherein at least a portion of the sensor remains in the infused and cured fiber lay-up of the manufactured blade.

10. The method according to claim 1, wherein the altering the process further includes opening a resin inlet channel and/or increasing the infusion pressure.

11. The method according to claim 1, wherein the sensor data is collected by a plurality of sensors arranged at discrete locations along a longitudinal direction of the wind turbine blade.

* * * * *